INVENTORS
Kenneth A. Aho &
BY Ronald C. Treloar

Robert L. Spencer
ATTORNEY

INVENTORS
Kenneth A. Aho
Ronald C. Treloar
BY Robert L. Spencer
ATTORNEY

Feb. 1, 1966  K. A. AHO ETAL  3,232,135
CONTROL SYSTEM DELASHING DEVICE
Filed April 13, 1964  3 Sheets-Sheet 3

INVENTORS
Kenneth A. Aho &
BY Ronald C. Treloar

Robert L. Spencer
ATTORNEY

United States Patent Office 3,232,135
Patented Feb. 1, 1966

3,232,135
CONTROL SYSTEM DELASHING DEVICE
Kenneth A. Aho and Ronald C. Treloar, Saginaw, Mich., assignors to General Motors Corporation, Detroit, Mich., a corporation of Delaware
Filed Apr. 13, 1964, Ser. No. 359,149
7 Claims. (Cl. 74—494)

This invention relates to a power transmitting assembly and more particularly to such an assembly wherein power may be transmitted from either one of a pair of master control units to a single slave unit. In certain applications it is desirable to provide spaced dual control master control units operably connected to a single slave unit whereby the slave unit may be rotated through limited angular rotation in opposite directions with a very high degree of accuracy in response to angular rotation of either one of the two master control units.

The invention herein described is particularly adapted for use in controlling steering control linkage of automotive vehicles where a high degree of accuracy of response of the slave unit to control by either of the master units is required irrespective of which master control unit is being employed and irrespective of the direction of rotation of the master control unit being employed. For cost savings, for accommodation to the vehicle, for simplicity of assembly and installation in the vehicle, it is highly desirable to employ a belt or sprocket and chain system or a combination of the same to interconnect the two master control units and the slave unit. In systems requiring a high degree of accuracy of response on the part of the slave unit such as in vehicle steering controls, such systems have heretofore been found to be unsatisfactory due to inability to achieve a sufficiently accurate and consistent response on the part of the slave unit due to inherent lash in the belts and chains employed.

The present invention provides delashing mechanism which is simple and inexpensive, which completely delashes the chains of the entire system, which is effective irrespective of which master control unit is actuated, and which is operable irrespective of the direction of rotation of the master control unit being actuated.

In accomplishing the advantages of this invention, a single preloaded torsion spring is effective to apply torque to all members of the system to take up all slack in the members whereby the various master and slave units are operatively connected to each other and to maintain such delashed condition irrespective of the direction of rotation of any unit in the system.

The single torsion spring is positioned in a chamber formed between a pulley and its hub and fully enclosed in the chamber, thereby providing a compact assembly which is effective to apply torsional forces to the pulley and hub tending to rotate the pulley and hub in opposite directions of rotation.

Various details of the assembly and its components will be apparent from the following description and drawings in which.

Figure 1:
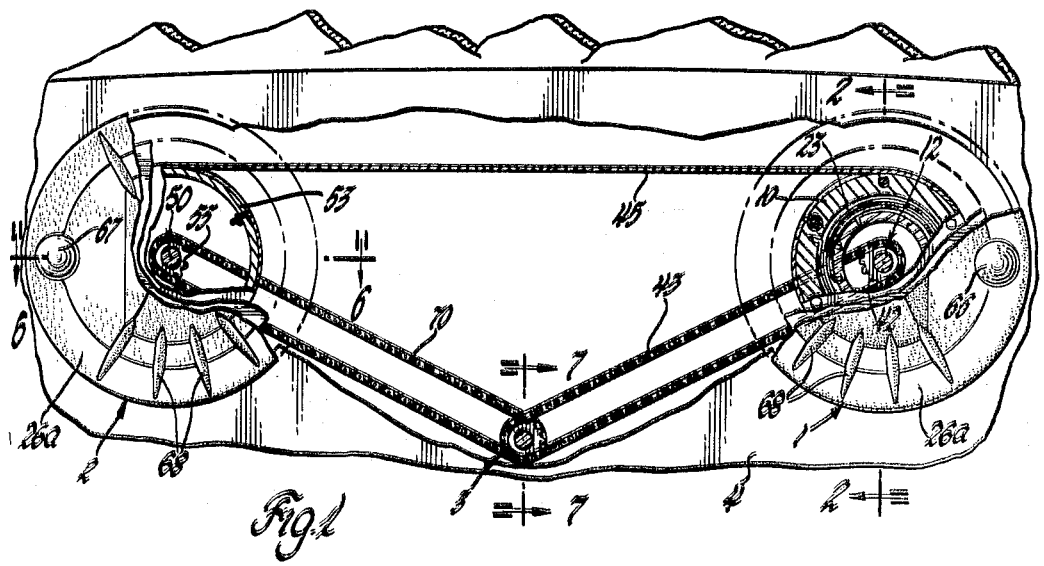
FIGURE 1 is a drawing of an assembly of a system incorporating two master units and a slave unit interconnected with each other and including delashing mechanism for delashing the elements whereby the master and slave units are interconnected.

In FIGURE 1 there is shown an assembly including first and second manually rotatable master control units 1 and 2 and a slave unit 3 all supported upon a common support 4. Slave unit 3 is operably connected to units 1 and 2 for angular rotation in response to angular rotation of either unit 1 or unit 2.

Figure 2:
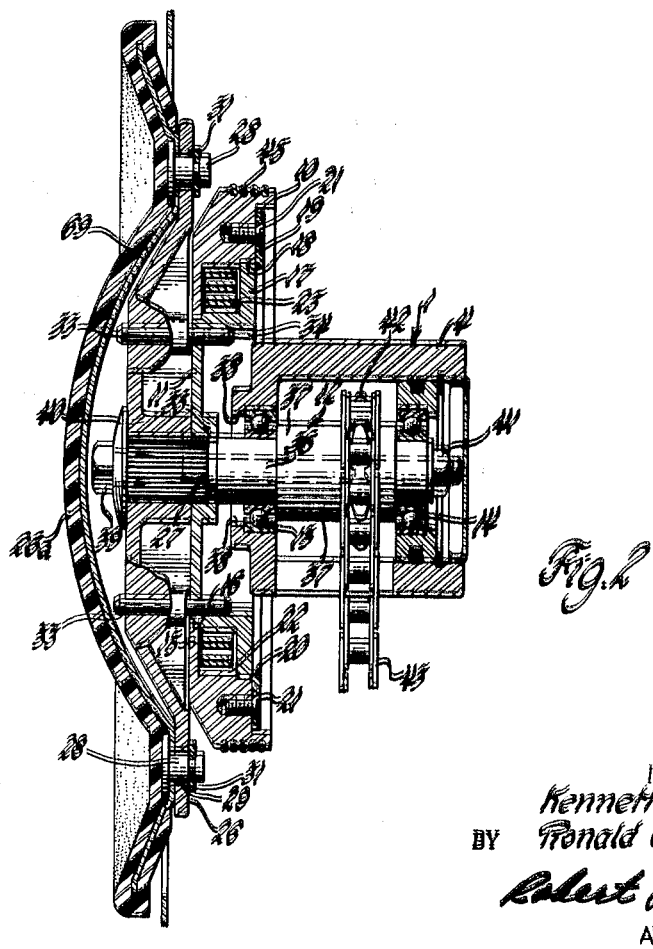
FIGURE 2 is a sectional view of a first master control unit taken along te line 2—2 of FIGURE 1.
Figures 3, 4:
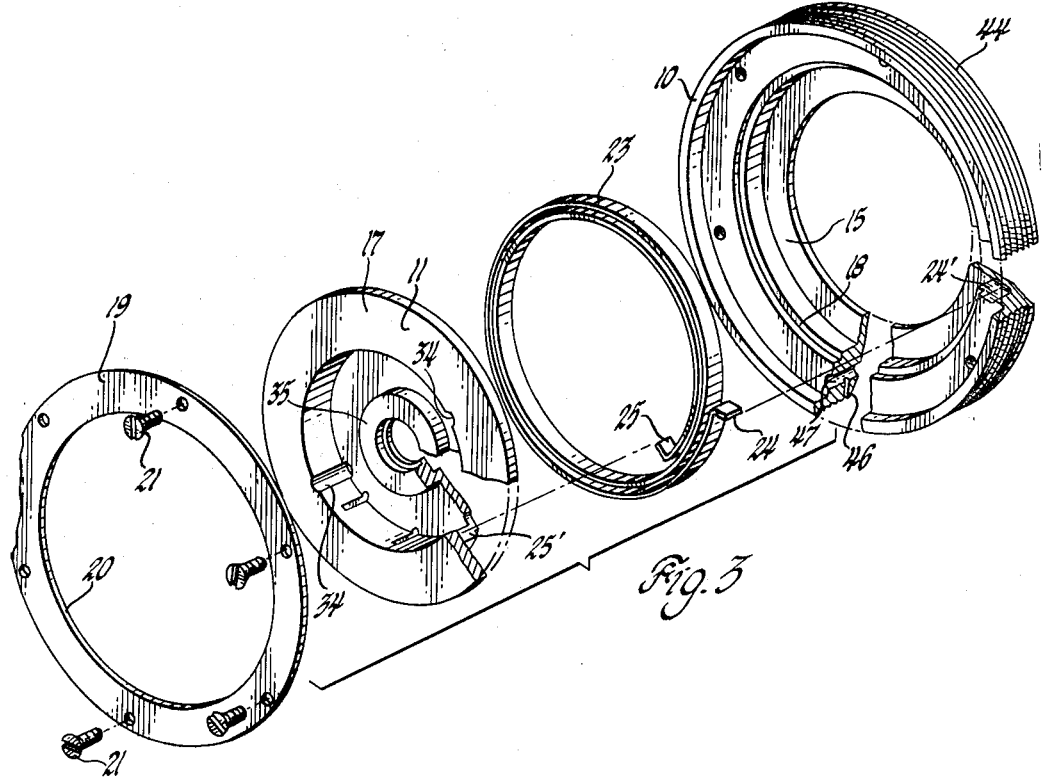
FIGURE 3 is an exploded view of an assembly of the pulley, spring and pulley hub of the unit shown in FIGURE 2.
FIGURE 4 is an exploded view of the moulding hub and moulding cover of the unit shown in FIGURE 2.

As best shown in FIGURE 2, master control unit 1 includes a pulley 10 carried by a pulley hub 11 carried by a rotatable shaft 12 and rotatable as a unit with shaft 12. Shaft 12 is rotatably supported in housing 4 by means of bearings 13, 14. Pulley 10 includes an annular flange 15 fitted into an annular recess 16 of hub 11 and hub 11 includes a flange 17 extending into a recess 18 on pulley 10. In this manner, pulley 10 may be rotated with respect to hub 11, and the flanges of the pulley and hub cooperate to provide a closed chamber 22 adapted to receive a flat coil torsion spring 23. An annular washer or retainer 19 has an inner lip portion 20 which overlies flange 17 of hub 11. Retainer 19 may be secured to pulley 10 by means of a plurality of screws 21. As best shown in FIGURE 3, spring 23 is provided with a pair of upstanding end tabs 24 and 25 whereby the spring 23 may be connected to pulley 10 and pulley hub 11. End tab 24 fits into a recess 24′ formed in pulley 10, while end tab 25 fits into a recess 25′ formed in pulley hub 11. It will be apparent that pulley 10 may be rotated with respect to the hub 11 to wind up or preload spring 23.

Referring to FIGURES 2 and 3, there is shown a moulding support 26 for supporting a moulding 26a on a splined portion 27 of sprocket shaft 12. Moulding 26a carries a plurality of fasteners 28 adapted to extend through openings 29 in moulding support hub 26. Fasteners 28 may comprise bolts adapted to receive nuts 30, as shown in FIGURE 4, or may be adapted to receive snap rings 31 as shown in FIGURE 2. In addition, a pair of spaced pins 33 carried by moulding support hub 26 extends into openings 34 provided in pulley hub 11.

In assembling the pulley and moulding to shaft 12, pulley hub 11 is placed on shaft 12 with an annular flange 35 thereof in contact with the side wall of a bearing support portion 36. An enlarged sprocket portion 37 of shaft 12 contacts the end of the inner race of bearing 13. The outer race of bearing 13 contacts a lip 38 of housing 4. A bolt 39 extends through shaft 12 and moulding hub 26, the shaft carrying a wave washer 40 adjacent its head and a nut 41 at the opposite end thereof. Shaft 12 carries sprocket teeth 42 adapted to receive a chain 43. Pulley 10 is provided with a plurality of grooves 44 adapted to receive a cable 45. As best shown in FIGURE 3, an opening 46 extends from the base of one of the grooves 44 radially inwardly to an axially extending passage 47. One end of cable 45 is secured to pulley 10 by inserting the end of the cable through opening 46 into opening 47. A screw (not shown) may be inserted into passage 47 to fasten the cable to pulley 10. Bolt 39 includes a conical tapered portion 48 for purposes hereafter explained.

Figure 5:
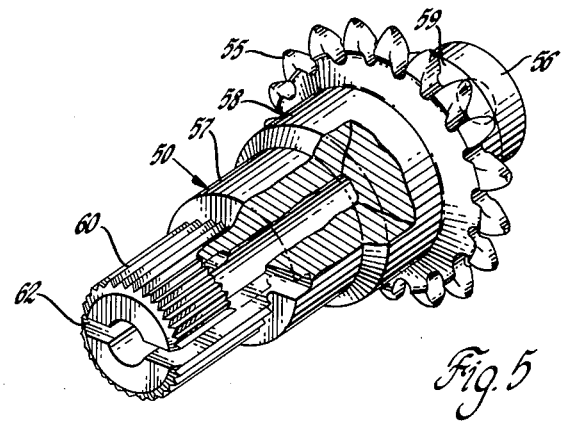
FIGURE 5 is a perspective view illustrating details of one of two similar sprocket shafts.
Figure 6:
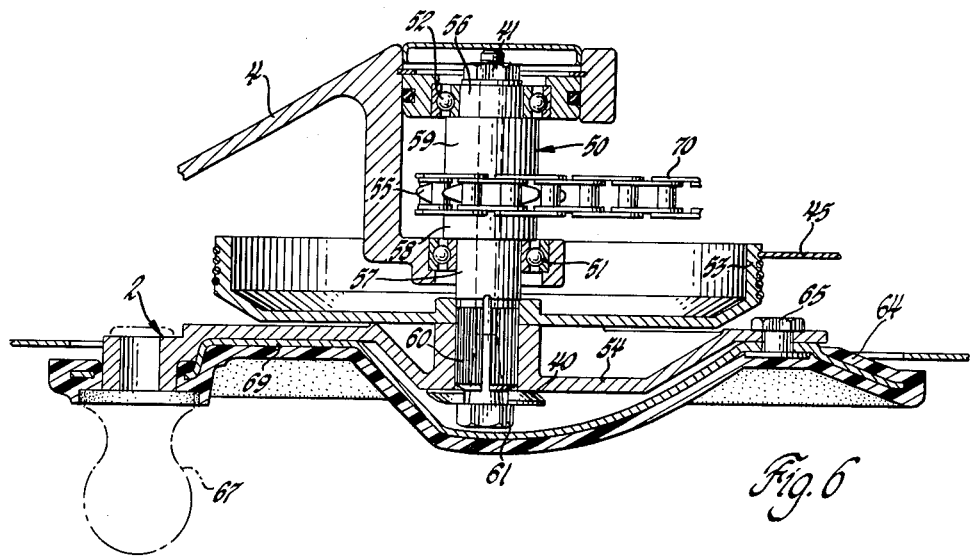
FIGURE 6 is a sectional view taken along the line 6—6 of FIGURE 1.

Referring to FIGURES 5 and 6, there is shown the second master control unit 2, which is in general of similar construction as master control unit 1, but of simpler construction in that the pulley and hub are integral and the torsion spring 23 of unit 1 is omitted. As shown, control unit 2 includes a sprocket shaft 50 rotatably supported in housing 4 by means of bearings 51 and 52. A pulley 53 is carried by sprocket shaft 50 for rotation therewith. A moulding support housing 54 is also splined on shaft 50 for rotation therewith.

As best shown in FIGURE 5, sprocket shaft 50 carries sprockets 55, is provided with bearing support surfaces 56, 57, the diameter of surfaces 56, 57 being less than that of sprocket bearing portion 58, 59. Splines 60 receive cooperating splines on the pulley hub and moulding support housing. A bolt 61 similar to bolt 39 of FIGURE 4 is provided to retain the assembly in assembled relationship. It will be noted that the sprocket shafts 12 and 50 are of similar construction and both are slotted at 62. In assembling either master control unit, the conical tapered portion 48 of bolt 39 extends into the slotted portion of the sprocket shaft 12 or 50 to spread apart the splined portion of the shaft in response to tightening of the nut on the end of the shaft. The pulley hub, moulding support hub of each structure is automatically moved axially with respect to the splined portion so that the hub of the pulley bears against the shoulder formed between the reduced diameter spline portion and the bearing support portion of the sprocket shaft.

In FIGURE 6, a moulding 64 may be fastened to moulding support housing 54 by suitable fasteners 65 and a handle 67 may be carried by support housing 54 providing a grip for rotating the assembly. A similar handle 66 may be provided for the first master control unit as shown in FIGURE 1. As shown in FIGURE 4, raised ribs 68 may be moulded into each cover moulding for gripping purposes. A reinforcing plate 69 is supplied for each moulding cover.

It will be apparent that both master control units 1 and 2 are of similar structure except that unit 1 is provided with a pulley relatively rotatable with respect to its hub and with the torsion spring. Cable 45 is wound around pulley grooves formed in pulley 53 and the end of cable 45 is secured to pulley 53 in the same manner as described in connection with pulley 10. A second chain 70 mates with sprocket teeth 55.

Figure 7:
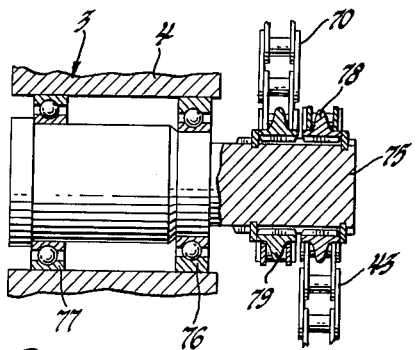
FIGURE 7 is a sectional view taken along the line 7—7 of FIGURE 1.

As shown in FIGURE 7, slave unit 3 includes a sprocket shaft 75 supported for rotation in support housing 4 by means of bearings 76, 77 and carries sprockets 78 and 79 splined thereto for rotation therewith. Sprocket 78 mates with chain 43 and sprocket 79 mates with chain 70.

Slave unit 3 may be connected to a vehicle steering linkage (not shown) to actuate the linkage in response to limited angular rotation of either master unit 1 or master unit 2.

In operation, the torsion spring 23 imposes a preloaded torque upon pulley 10 which by design is higher than the torque required to rotate slave shaft 75. Torsion spring 23 will not yield or "wind up" due to load applied thereto when either master unit 1 or master unit 2 is rotated, and pulley 10 will not rotate relative to pulley hub 11 and sprocket shaft 12 during angular rotation of either master control unit. Preloaded spring 23 maintains a torque on pulley 10 tending to rotate pulley 10 in one direction and pulley hub 11 and sprocket shaft 12 in the opposite direction. Due to the action of preloaded cable 45, pulley 10, pulley 53 and sprocket 55 tend to rotate clockwise as viewed in FIGURE 1. Pulley hub 17 and sprocket 42 tend to rotate counterclockwise due to action of spring 23.

Sprocket 42, acting through chain 43, tends to rotate sprocket 78 and slave unit shaft 75 counterclockwise. However, since cable 45 is applying torque to sprocket 55 tending to rotate sprocket 55 clockwise, this sprocket 55 acting through chain 70 applies an equal and opposite torque to shaft 70 tending to rotate shaft 75 clockwise.

It will be readily apparent that the clockwise torque applied to slave unit 2 and the counterclockwise torque applied to slave unit 2 will offset each other after all of the slack is taken up between the various units and the chains will be completely delashed. Since the torsion applied by preloaded spring 23 is greater than that required to rotate shaft 75 in operation of the vehicle steering mechanism, the entire system including chains 43 and 70 is completely delashed. The chains are delashed with the system "at rest" with no steering force applied to either master control unit and remains delashed when steering forces are applied to any member of the system irrespective of the direction of rotation of any member of the system.

While the delashing system has been specifically described in a pulley and chain combination, it will readily be understood that it may be employed in a gearing system if desired. For example, the slave unit 3 may be connected to master control units 1 and 2 by means of suitable gearing rather than chains and sprockets as shown. In such an arrangement, the delashing system will be equally effective to eliminate slack in gear teeth contact in the same manner as that described in the chain and sprocket arrangement.

We claim:

1. In a control system, a first rotatable assembly, a second rotatable assembly, a third rotatable assembly, means connecting said third rotatable assembly to said first rotatable assembly for rotating said third assembly in response to rotation of said first assembly, means connecting said third assembly to said second assembly for rotating said third assembly in response to rotation of said second assembly, said first assembly including two relatively rotatable elements and a rotatable shaft, means connecting one of said rotatable elements to said shaft for rotation with said shaft, the other of said rotatable elements being supported upon said one rotatable element for limited rotation relative to said one rotatable element, means applying torque to each of said elements tending to rotate said elements relative to each other, and means connecting said second rotatable assembly to one element of said first rotatable assembly for applying torque to said second rotatable assembly from said first rotatable assembly.

2. In a control system, first, second and third rotatable units, said first unit including a rotatable shaft, a pulley hub fixed to said shaft for rotation therewith, a pulley on said hub and rotatable with respect to said hub, biasing means applying torque to said hub and pulley tending to rotate said hub and pulley relative to each other, said second rotatable unit including a second shaft and a second pulley rotatable with said second shaft, said third unit including a third rotatable shaft, means connecting said first unit shaft to said third unit shaft, means connecting said second unit shaft to said third unit shaft, and means connecting said first unit pulley to said second unit pulley.

3. In a control system, first and second master control units and a slave unit adapted to be selectively controlled by either of said master control units, said first master control unit including a rotatable shaft, a pulley hub supported on said shaft for rotation therewith, a pulley supported on said hub and relatively rotatable with respect thereto, biasing means operably connected between said hub and pulley normally effective to apply torque to said hub and pulley tending to rotate said hub and pulley in opposite directions of rotation, said second master control unit including a rotatable shaft and a pulley supported on said shaft for rotation therewith, said third slave unit including a rotatable shaft, means connecting said first master control unit shaft to said slave unit shaft, means connecting said second master control unit shaft to said slave unit shaft, and means connecting said first master unit pulley to said second master unit pulley for transmitting torque from said first master unit pulley to said second master unit pulley.

4. In a control system, first and second selectively rotatable master control units and a third rotatable slave unit adapted to be rotated in response to rotation of either of said master control units, said first master control unit comprising a rotatable shaft, a pulley hub supported upon said shaft for rotating said shaft and a pulley supported on said hub, said second master control unit including a rotatable shaft and a pulley carried by said shaft for rotation therewith, said slave unit including a rotatable shaft, means connecting said first master control unit shaft to said slave unit shaft for transmitting torque from said first master control unit shaft to said slave unit shaft, means connecting said second master control unit shaft to said slave unit shaft for transmitting torque from said second master control unit shaft to said slave unit shaft, biasing means carried by said first master control unit for imposing torque on said first control unit pulley and hub tending to rotate said pulley and hub in opposite directions, and means connecting said first master control unit pulley to said second master control unit pulley for transmitting torque imposed by said biasing means from said first to said second pulley.

5. In a control system, first and second manually controllable and selectively rotatable master control units, a slave unit adapted to be rotated in response to rotation of either of said master control units, said first master control unit including a shaft, a pulley hub carried by said shaft for rotation therewith, a pulley supported on said hub for rotation with respect to said hub, said hub and pulley forming a closed pocket therebetween, biasing means disposed in said pocket and imposing torque on said hub and pulley tending to rotate said hub and pulley in opposite directions of rotation with respect to each other, said second master control unit including a rotatable shaft having a pulley carried by said shaft for rotation therewith, said slave unit including a rotatable shaft, flexible means connecting said first master control unit shaft to said slave unit shaft for rotating said slave unit shaft in response to rotation of said first master control unit shaft, flexible means connecting said second master control unit shaft to said slave unit shaft for rotating said slave unit shaft in response to rotation of said second master control unit shaft, and means connecting said first master control unit pulley to said second master control unit pulley for transmitting biasing torque from said first master control unit pulley to said second master control unit pulley.

6. In a control system, first and second manually controllable and selectively rotatable master control units, a slave unit adapted to be rotated in response to rotation of either of said master control units, said first master control unit including a rotatable shaft, a pulley hub carried by said shaft and rotatable therewith, a pulley carried by said hub and rotatable with respect to said hub, said second master control unit including a rotatable shaft and a pulley supported on said shaft for rotation therewith, said slave unit including a rotatable shaft, flexible means for connecting said first control unit shaft to said slave unit shaft, flexible means connecting said second control unit shaft to said slave unit shaft, a spring between said first control unit pulley hub and pulley normally effective to apply torque to said first unit pulley and hub tending to rotate said pulley and hub in opposite directions of rotation, and a cable connecting said first unit pulley to said second unit pulley for transmitting spring torque from said first to said second pulley, said spring torque being of greater magnitude than the torque required to rotate said slave unit and effective to remove slack from said flexible connecting means.

7. In a control system, first and second manually and selectively rotatable master control units, a slave unit adapted to be rotated in response to rotation of either of said master control units, said first master control unit including a rotatable shaft, a sprocket rotatable with said shaft, a hub supported on said shaft for rotation therewith, a pulley supported on said hub and rotatable with respect to said hub, said second master control unit including a shaft, a sprocket on said last-mentioned shaft rotatable with said shaft, a pulley on said last-mentioned shaft rotatable with said shaft, said slave unit including a rotatable shaft, a pair of sprockets on said slave unit shaft rotatable therewith, a chain connecting the sprocket of said first master control unit to one of said slave unit sprockets, a second chain connecting said second control unit sprocket to said slave unit sprocket, a cable connecting said pulleys to each other, and means for applying torque to both of said chains to remove slack from said chains comprising a spring disposed between said hub and pulley of said first master control unit, said spring applying a torque to said control unit hub and pulley tending to rotate said hub and pulley in opposite directions of rotation, the torque applied by said spring being greater than the torque required to rotate said slave unit shaft.

No references cited.

MILTON KAUFMAN, *Primary Examiner*.